US012392466B2

(12) United States Patent
Fischer et al.

(10) Patent No.: US 12,392,466 B2
(45) Date of Patent: Aug. 19, 2025

(54) ILLUMINATION APPARATUS FOR A MOTOR VEHICLE

(71) Applicant: HELLA GmbH & Co. KGaA, Lippstadt (DE)

(72) Inventors: Bernd Fischer, Altenbeken (DE); Marc Kaup, Paderborn (DE); Dirk Kliebisch, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 184 days.

(21) Appl. No.: 18/116,077

(22) Filed: Mar. 1, 2023

(65) Prior Publication Data

US 2023/0204174 A1 Jun. 29, 2023

Related U.S. Application Data

(63) Continuation of application No. PCT/EP2021/074115, filed on Sep. 1, 2021.

(30) Foreign Application Priority Data

Sep. 2, 2020 (DE) ..................... 10 2020 122 896.1

(51) Int. Cl.
*F21S 41/20* (2018.01)
*F21S 41/255* (2018.01)

(52) U.S. Cl.
CPC ........... *F21S 41/255* (2018.01); *F21S 41/285* (2018.01)

(58) Field of Classification Search
CPC ...... F21S 41/143; F21S 41/147; F21S 41/151; F21S 41/255; F21S 41/285; F21S 41/322
See application file for complete search history.

(56) References Cited

U.S. PATENT DOCUMENTS

| | | | |
|---|---|---|---|
| 7,182,482 | B2 | 2/2007 | Sinesi et al. |
| 10,232,763 | B1 | 3/2019 | Eckstein et al. |

(Continued)

FOREIGN PATENT DOCUMENTS

| | | | |
|---|---|---|---|
| DE | 102018107213 A1 | 10/2019 | |
| EP | 1528527 A1 | 5/2005 | |

OTHER PUBLICATIONS

International Search Report dated Nov. 3, 2021 in corresponding application PCT/EP2021/074115.

*Primary Examiner* — Tung X Le
(74) *Attorney, Agent, or Firm* — Muncy, Geissler, Olds & Lowe, P.C.

(57) ABSTRACT

An illumination apparatus for a motor vehicle having at least one light source from which light is emitted when the illumination apparatus is in operation, a collimation optical system through which, when the illumination apparatus is in operation, the light emitted from the at least one light source passes at least in part, and a secondary optical system with at least one array of cylinder lenses arranged adjacently on a face, through which, when the illumination apparatus is in operation, the light emitted by the collimation optical system passes at least in part, wherein the secondary optical system has an entry face and an exit face for the light emitting from the collimation optical system. The secondary optical system being arranged such that the exit face of the secondary optical system forms an angle unequal to 0° or unequal to 180° with the vertical when the illumination apparatus is installed.

16 Claims, 3 Drawing Sheets

(56) References Cited

U.S. PATENT DOCUMENTS

| | | | | |
|---|---|---|---|---|
| 10,295,137 | B2 * | 5/2019 | Stefanov | F21S 41/635 |
| 10,563,836 | B2 | 2/2020 | Fischer et al. | |
| 2012/0033441 | A1 * | 2/2012 | Sousek | F21S 43/14 362/555 |
| 2014/0328071 | A1 | 11/2014 | Son et al. | |
| 2014/0347737 | A1 * | 11/2014 | Lvovskiy | G02B 27/0101 359/641 |
| 2015/0078029 | A1 * | 3/2015 | Kumar | F21S 41/336 362/522 |
| 2016/0084469 | A1 | 3/2016 | Fukui et al. | |
| 2016/0265733 | A1 * | 9/2016 | Bauer | F21S 41/16 |
| 2018/0306400 | A1 * | 10/2018 | Muegge | F21S 43/30 |
| 2019/0072252 | A1 * | 3/2019 | Moser | F21S 41/68 |
| 2019/0186708 | A1 * | 6/2019 | Ecker-Endl | F21S 41/285 |
| 2019/0301696 | A1 * | 10/2019 | Fischer | F21S 41/285 |
| 2020/0207256 | A1 | 7/2020 | Choi et al. | |
| 2020/0248890 | A1 * | 8/2020 | Osaka | G02B 7/04 |
| 2022/0364702 | A1 * | 11/2022 | Fischer | F21S 41/151 |

* cited by examiner

ILLUMINATION APPARATUS FOR A MOTOR VEHICLE

This nonprovisional application is a continuation of International Application No PCT/EP2021/074115, which was filed on Sep. 1, 2021, and which claims priority to German Patent Application No 10 2020 122 896.1, which was filed in Germany on Sep. 2, 2020, and which are both herein incorporated by reference.

BACKGROUND OF THE INVENTION

Field of the Invention

The present invention relates to an illumination apparatus for a motor vehicle, in particular a headlight for a motor vehicle.

Description of the Background Art

An illumination apparatus of the aforementioned type is known from DE 10 2018 107 213 A1, which corresponds to US 2019/0301696, and which is incorporated herein by reference. The illumination apparatus described therein is designed as a headlight and comprises three light sources formed as light-emitting diodes (LED), from which light is emitted when the illumination apparatus is in operation. The illumination apparatus further comprises a collimation optical system with three collimation lenses, wherein in each case one of the light sources is assigned one of the collimation lenses, so that the light which is emitted from one of the light sources passes through the associated collimation lens. The illumination apparatus further comprises a secondary optical system serving as a projection optical system, through which the light emitted by the collimation optical system passes. In this case, the secondary optical system has a substrate with an array of cylinder lenses on an entry face facing the collimation optical system and with an opposing exit face. The cylinder lenses have vertically aligned cylinder axes when the illumination apparatus is installed in the motor vehicle, so that the array of cylinder lenses causes a horizontal spread of the light distribution. Both the entry face and the exit face are aligned parallel to the grid, so that the normals on the entry face and the exit face each form an angle of 90° with the vertical and are parallel to the vehicle longitudinal direction.

There is a need to adapt headlights to a vehicle contour such that the exit face of the secondary optical system is inclined and/or swept or that the normal on the exit face of the secondary optical system forms an angle unequal to 90° with the vertical and/or an angle unequal to 0° or 180° with the vehicle longitudinal direction. Due to the inclination of the exit face of the secondary optical system, in an otherwise unchanged illumination apparatus design, a light distribution is created that is deformed. Due to the sweep of the exit face of the secondary optical system, in an otherwise unchanged illumination apparatus design, a light distribution is created that is skewed.

SUMMARY OF THE INVENTION

It is therefore an object of the present invention to provide an illumination apparatus, in which the light distribution generated by the illumination apparatus in the exterior of the vehicle is not deformed and/or skewed despite an inclination and/or sweep of the exit face of the secondary optical system.

In an exemplary embodiment, it is provided that the secondary optical system is arranged in the illumination apparatus in such a way that the exit face of the secondary optical system forms an angle unequal to 0° or unequal to 180° with the vertical when the illumination apparatus is installed in the motor vehicle, and that the entry face of the secondary optical system and/or the face on which the at least one array of cylinder lenses is arranged forms an angle unequal to 0° or unequal to 180° with the exit face of the secondary optical system. In particular, the normal on the entry face of the secondary optical system and/or on the face on which the at least one array of cylinder lenses is arranged, when the illumination apparatus is installed in the motor vehicle, can form an angle between 70° and 110°, in particular an angle of about 90°, with the vertical. Despite the inclination of the exit face of the secondary optical system to the vertical, a deformation of the light distribution can be avoided by an inclination of the entry face and/or the face on which the at least one array of cylinder lenses is arranged opposite the exit face. At the same time, however, in certain circumstances this design may cause a shift in the light distribution, for example, downwards.

It may be provided that the collimation optical system can have an optical axis and is arranged in the illumination apparatus in such a way that the optical axis of the collimation optical system forms an angle unequal to 90° with the vertical when the illumination apparatus is installed in the motor vehicle. By this pivoting of the optical axis of the collimation optical system, the light distribution can be shifted as a whole, so that thereby the shift in the light distribution caused by an inclination of the exit face to the entry face and/or the face on which the that the at least one array of cylinder lenses is arranged, is compensated.

There is a possibility that the angle which the exit face of the secondary optical system forms with the vertical when the illumination apparatus can be installed in the motor vehicle is less than 30° or equal to 30°. Furthermore, the angle which the optical axis of the collimation optical system forms with the vertical when illumination apparatus is installed in the motor vehicle may be less than 30° or equal to 30°. It may therefore be provided that the normal on the exit face of the secondary optical system and the optical axis of the collimation optical system together form an angle less than 15°, preferably an angle less than 10°, in particular that the normal on the exit face of the secondary optical system is parallel to the optical axis of the collimation optical system.

It may be provided that the cylinder lenses of the at least one array of cylinder lenses can be arranged in the secondary optical system in such a way that the cylinder axes of the cylinder lenses are aligned substantially parallel to the vertical when the illumination apparatus is installed in the motor vehicle. By this arrangement of the cylinder lenses, a horizontal spread of the light distribution is achieved.

It is also provided that the secondary optical system can be arranged in the illumination apparatus in such a way that the normal on the exit face of the secondary optical system forms an angle unequal to 0° and unequal to 180° with the vehicle longitudinal direction when the illumination apparatus is installed in the motor vehicle, wherein the cylinder lenses of the at least one array are arranged in such a way that the cylinder axes of the cylinder lenses form an angle unequal to 0° and unequal to 180° with the vertical when the illumination apparatus is installed in the motor vehicle. Despite the sweep of the exit face of the secondary optical system or the inclination of the exit face to the longitudinal direction of the vehicle, an angle unequal to 0° between the cylinder axes of the cylinder lenses and the vertical can avoid an inclination of the light distribution.

It may be provided that the angle which the normal forms with the vehicle longitudinal direction on the exit face of the secondary optical system when the illumination apparatus is installed in the motor vehicle is less than 30° or equal to 30°.

Furthermore, the angle which the cylinder axes of the cylinder lenses form with the vertical when the illumination apparatus is installed in the motor vehicle may be a size between 1° and 10°, preferably a size between 2° and 7°, in particular a size of about 4°.

There is a possibility that the face on which the cylinder lenses are arranged adjacently corresponds to the entry face of the secondary optical system. For example, the secondary optical system may be wedge-shaped with a vertical entry face, on which the cylinder lenses are arranged, and with an inclined exit face with respect to the vertical. In particular, the cylindrical axes of the cylinder lenses of the at least one array are aligned parallel to each other.

It may be provided that the illumination apparatus comprises a plurality of arrays of cylinder lenses, wherein in particular the focal lengths of the cylinder lenses of different arrays are different from each other. In this case, the arrays of cylinder lenses can be arranged, when the illumination apparatus is installed in the motor vehicle, substantially vertically on top of each other and in particular form a plurality of entry faces of the secondary optical system. This plurality of entry areas may also be inclined with respect to the exit faces. Furthermore, the cylinder axes of the cylinder lenses of each of the entry faces may be parallel to each other and inclined to the vertical.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
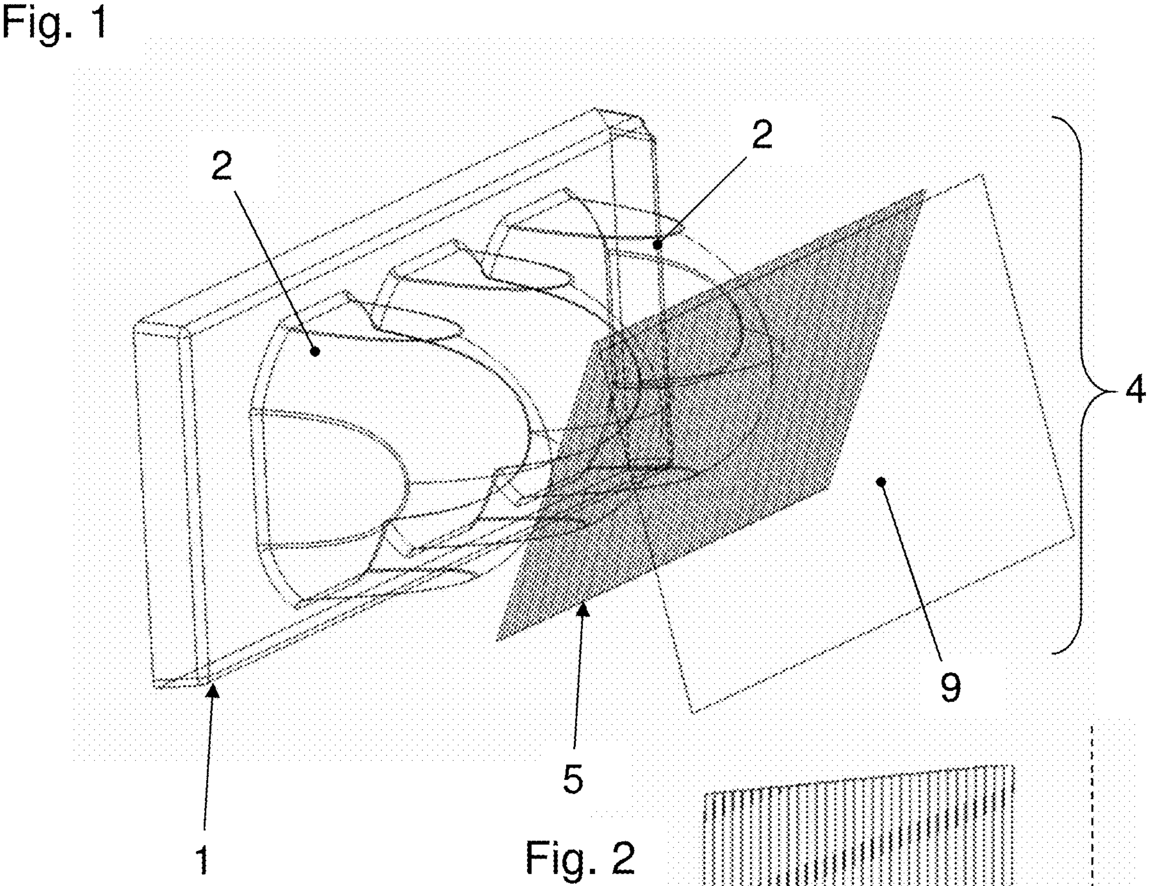
FIG. 1 is a perspective view of an example of an illumination apparatus according to the invention.
Figure 2:
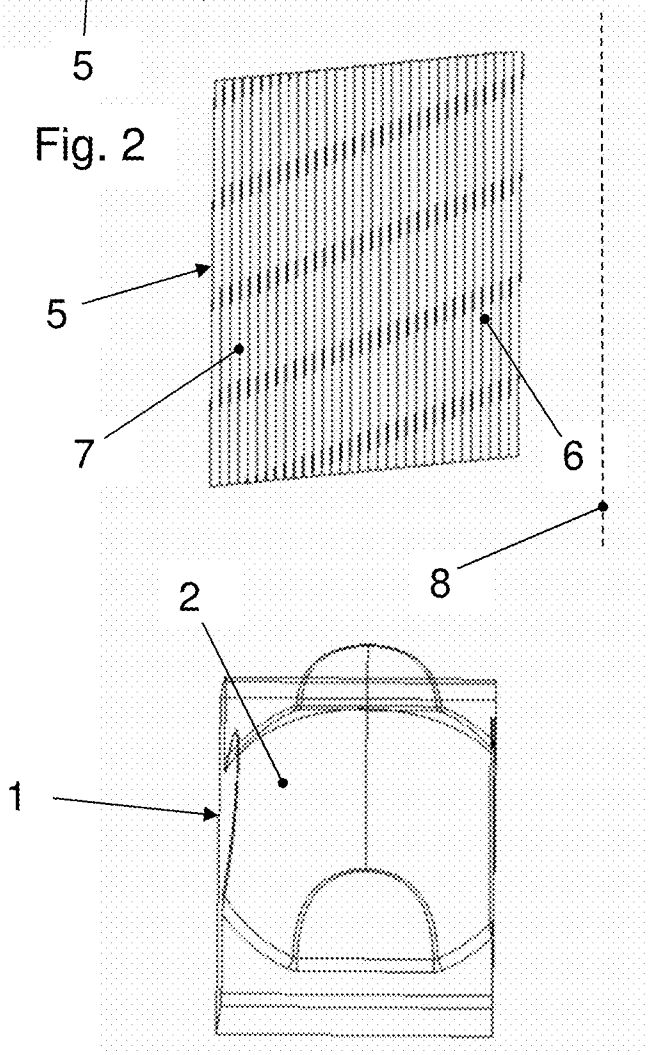
FIG. 2 is a perspective detail view of the illumination apparatus according to FIG. 1.
Figure 3:
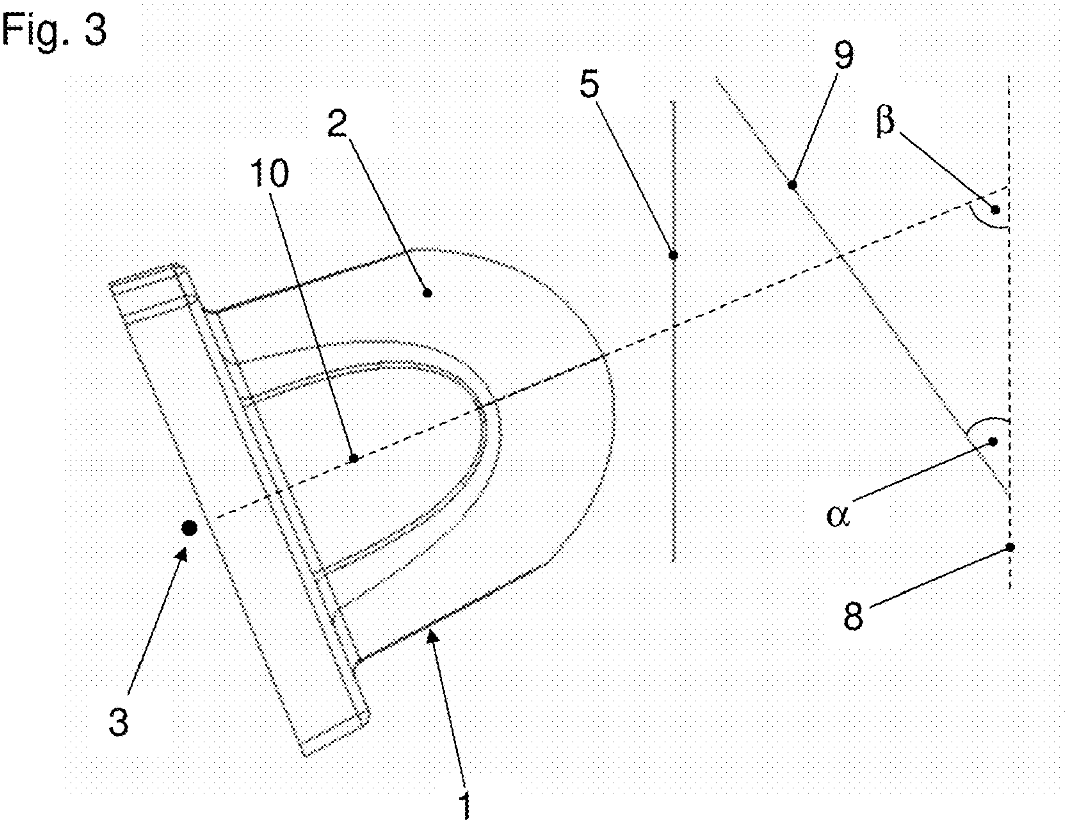
FIG. 3 is a side view of the illumination apparatus according to FIG. 1.

The example of an illumination apparatus according to the invention shown in FIGS. 1 to 3 is formed as a headlight. The illumination apparatus comprises a plurality of light sources, not shown, which are designed as light-emitting diodes (LEDs) from which light is emitted when the illumination apparatus is in operation. For example, the illustrated embodiment of the illumination apparatus may comprise three light-emitting diodes spaced from each other.

The illumination apparatus further comprises a collimation optical system 1, through which, when the illumination apparatus is in operation, the light emitted from the light sources passes at least in part. In the embodiment shown, the collimation optical system 1 comprises three adjacently arranged collimation lenses 2 which are connected to each other in one piece. In this case, each of the light-emitting diodes is assigned a collimation lens 2 and arranged in front of the light-emitting diode in such a way that the light emitted by the light-emitting diodes is largely collimated by the associated collimation lens 2. FIG. 3 indicates a typical position of the light-emitting diode in front of the collimation lens 2 by a dot 3.

Figure 4:
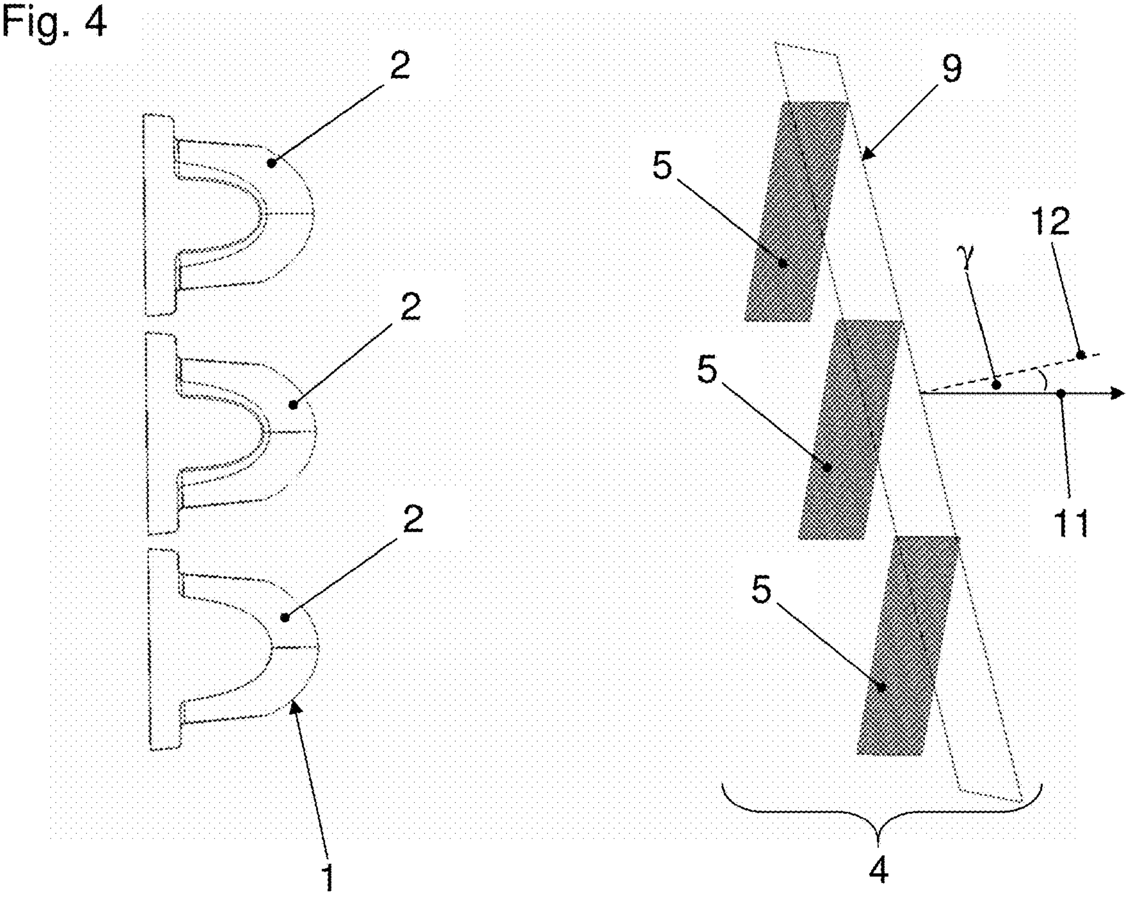
FIG. 4 is a perspective view of an example of an illumination apparatus

It is possible not to connect the collimation lenses 2 of the collimation optical system 1 in one piece, but instead to form them on separate substrates, as is for example provided in the embodiment shown in FIG. 4.

The illumination apparatus further comprises a secondary optical system 4, which has an array 5 of cylinder lenses 6 arranged adjacently on a face, through which, when the illumination apparatus is in operation, the light emitted from the collimation optical system 1 passes at least in part. The face on which the array 5 of cylinder lenses 6 is arranged corresponds in the illustrated embodiment to the entry face of the secondary optical system 4. It is quite possible to arrange the array 5 of cylinder lenses 6 on a face that does not correspond to the entry face.

The cylinder axes 7 of the cylinder lenses are aligned parallel to each other. Furthermore, the array 5 of cylinder lenses 6 is arranged in the secondary optical system 4 in such a way that the cylinder axes 7 of the cylinder lenses 6 are aligned substantially parallel to the vertical 8 schematically indicated in FIG. 2 when the illumination apparatus is installed in the motor vehicle. By this arrangement of the cylinder lenses 6, a horizontal spread of the light distribution generated by the illumination apparatus in the exterior of the motor vehicle is achieved.

The secondary optical system 4 further has an exit face 9 for the light which has entered through the entry face or passed through the array 5 of cylinder lenses 6. The secondary optical system 4 is arranged in the illumination apparatus in such a way that the exit face 9 is inclined to the vertical 8 when the illumination apparatus is installed in the motor vehicle. In FIG. 3, this inclination is illustrated by an angle $\alpha$ between the exit face 9 and the vertical 8. The angle $\alpha$ can be less than 30°, for example between 20° and 25°.

It is possible that the entry face and the exit face 9 are formed on a common substrate, so that the secondary optical system 4 has a wedge-shaped cross-section. Alternatively, it is also possible for the entry face and the exit face 9 to be formed on different, spaced substrates, as is the case in the embodiment shown in FIGS. 1 to 3.

In contrast to the exit face, the entry face or the face on which the array 5 of cylinder lenses 6 is formed is not inclined to the vertical. The entry face is thus parallel to the vertical and forms an angle to the exit face 9, which corresponds to the angle $\alpha$.

Due to the different alignment of the entry face or the face on which the array 5 of cylinder lenses 6 is formed, on the one hand, and the exit face on the other hand, a deformation of the light distribution can be avoided despite the inclination of the exit face 9 of the secondary optical system to the vertical 8.

In order to avoid a shift in the light distribution, for example downwards, in such a design, the collimation optical system 1 is arranged pivoted in the illumination apparatus. FIG. 3 shows that the optical axis 10 of the collimation optical system 1 forms an angle β with the vertical 8, which is unequal to 90°.

In particular, the angle β may be the same size as the angle α between the exit face 9 and the vertical 8. The normal on the exit face of the secondary optical system can therefore be parallel to the optical axis of the collimation optical system.

Figure 5:
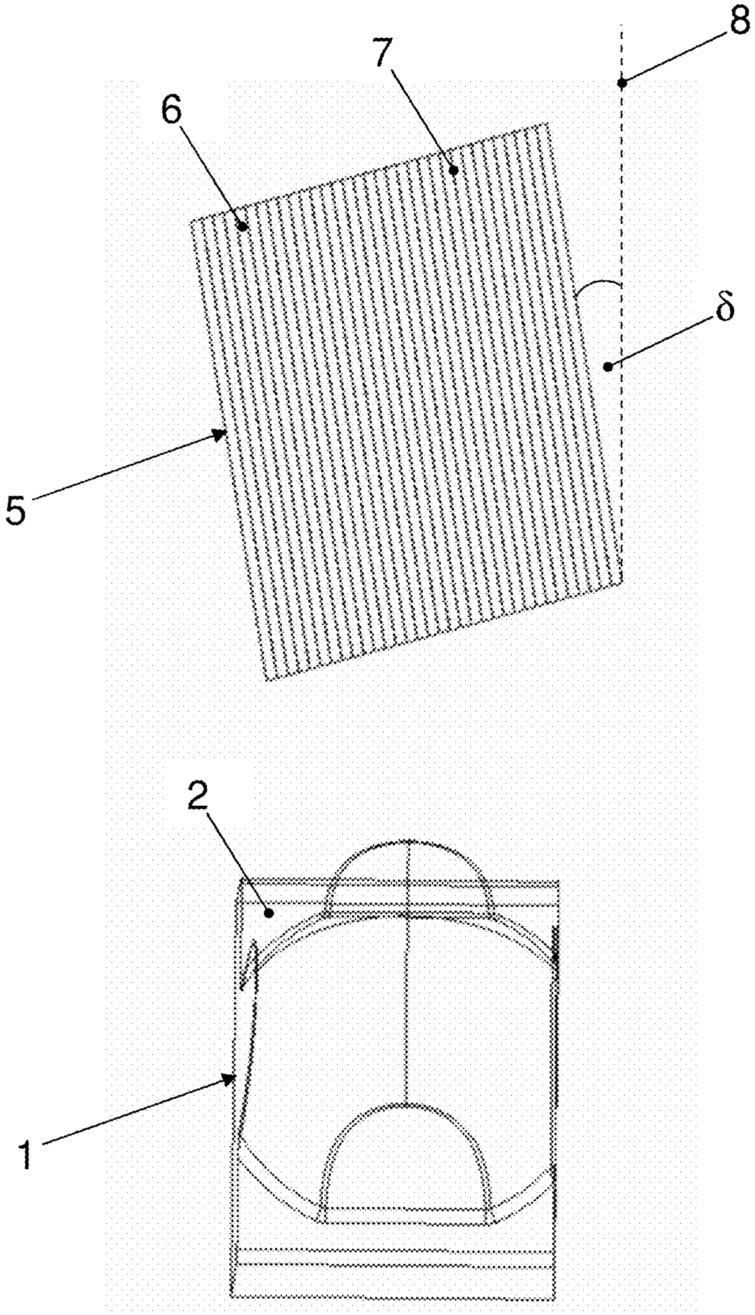
FIG. 5 is a perspective detail view of the illumination apparatus according to FIG. 1.

The example of the illumination apparatus illustrated in FIGS. 4 and 5 differs on the one hand from the first embodiment in that instead of a one-piece collimation optical system 1, separate collimation lenses 2 are provided. Furthermore, three arrays 5 of cylinder lenses 6 are provided on separate substrates, wherein in each case one of the arrays 5 is assigned to one of the collimation lenses 2 in such a way that the light emitting from the respective collimation lens 2 passes through the associated array 5 of cylinder lenses 6. In this case the cylinder axes 7 of all cylinder lenses 6 of the three arrays 5 are aligned parallel to each other. It may be provided that the focal lengths of the cylinder lenses 6 of different arrays 5 are different from each other.

Instead of providing three separate arrays 5, it is possible to provide a single array 5 of cylinder lenses for all collimation lenses 2, as is the case with the first embodiment. Alternatively, it may also be provided in the first embodiment to provide three arrays arranged on separate substrates 5, instead of a single array 5.

The second embodiment of the illumination apparatus further differs from the first embodiment in that the exit face 9 is inclined to the vehicle length direction 11 drawn in FIG. 4. The exit face therefore has a sweep. FIG. 4 makes it clear that the normal 12 on the exit face 9 forms an angle γ with the vehicle's longitudinal direction which is unequal 0°. The angle γ can be less than 30°, for example between 20° and 25°.

In order to avoid an inclination of the light distribution despite the sweep of the exit face 9 or the inclination of the exit face 9 to the vehicle longitudinal direction 11, in the second embodiment the cylinder axes 7 of the cylinder lenses 6 are pivoted with respect to the vertical 8. FIG. 5 illustrates a corresponding angle δ between the cylinder axes 7 of the cylinder lenses 6 and the vertical 8. The angle δ may be a size between 1° and 10°, preferably a size between 2° and 7°, in particular a size of about 4°.

In the second embodiment according to FIGS. 4 and 5, the exit face 9 of the secondary optical system 4 is both inclined to the vertical 8 and inclined to the vehicle longitudinal direction 11 or a sweep. It is quite possible to provide an embodiment in which the exit face 9 of the secondary optical system 4 is inclined to the vehicle longitudinal direction 11 or swept, but at the same time the exit face 9 of the secondary optical system 4 is not inclined to the vertical 8

The invention being thus described, it will be obvious that the same may be varied in many ways. Such variations are not be regarded as a departure from the spirit and scope of the invention, and all such modifications as would be obvious to one skilled in the art are to be included within the scope of the following claims.

What is claimed is:

1. An illumination apparatus for a motor vehicle, the apparatus comprising:

at least one light source, from which light is emitted when the illumination apparatus is in operation;

a collimation optical system through which, when the illumination apparatus is in operation, the light emitted from the at least one light source passes at least in part; and a secondary optical system with at least one array of cylinder lenses which are arranged adjacently on a face and through which, when the illumination apparatus is in operation, the light emitted by the collimation optical system passes at least in part, the secondary optical system having an entry face and an exit face for the light emitted by the collimation optical system, wherein the secondary optical system is arranged in the illumination apparatus in such a way that the exit face of the secondary optical system forms an angle unequal to 0° or unequal to 180° with the vertical when the illumination apparatus is installed in the motor vehicle, and wherein the entry face of the secondary optical system and/or the face on which the at least one array of cylinder lenses is arranged forms an angle unequal to 0° or unequal to 180° with the exit face of the secondary optical system.

2. The illumination apparatus according to claim 1, wherein the normal on the entry face of the secondary optical system and/or on the face on which the at least one array of cylinder lenses is arranged forms an angle between 70° and 110° or an angle of approximately 90° with the vertical when the illumination apparatus is installed in the motor vehicle.

3. The illumination apparatus according to claim 1, wherein the collimation optical system has an optical axis and is arranged in the illumination apparatus such that the optical axis of the collimation optical system forms an angle unequal to 90° with the vertical when the illumination apparatus is installed in the motor vehicle.

4. The illumination apparatus according to claim 3, wherein the angle which the optical axis of the collimation optical system forms with the vertical when the illumination apparatus is installed is less than 30° or equal to 30°.

5. The illumination apparatus according to claim 3, wherein the normal on the exit face of the secondary optical system and the optical axis of the collimation optical system form an angle of less than 15° or an angle of less than 10° with each other or wherein the normal on the exit face of the secondary optical system is parallel to the optical axis of the collimation optical system.

6. The illumination apparatus according to claim 1, wherein the angle in which the exit face of the secondary optical system forms with the vertical when the illumination apparatus is installed in the motor vehicle is less than 30° or equal to 30°.

7. The illumination apparatus according to claim 1, wherein the cylinder lenses of the at least one array of cylinder lenses are arranged in the secondary optical system such that the cylinder axes of the cylinder lenses are aligned substantially parallel to the vertical when the illumination apparatus is installed in the motor vehicle.

8. The illumination apparatus according to claim 7, wherein the cylinder axes of the cylinder lenses of the at least one array are aligned parallel to each other.

9. The illumination apparatus according to claim 1, wherein the face on which the cylinder lenses are arranged adjacently corresponds to the entry face of the secondary optical system.

10. The illumination apparatus according to claim 1, wherein the illumination apparatus comprises a plurality of arrays of cylinder lenses, wherein focal lengths of the cylinder lenses of different arrays are different from each other.

11. The illumination apparatus according to claim 10, wherein the arrays of cylinder lenses are arranged substantially vertically one above the other when the illumination apparatus is installed in the motor vehicle, thereby forming a plurality of entry faces of the secondary optical system.

12. The illumination apparatus according to claim 1, wherein the illumination apparatus is a headlight for the motor vehicle.

13. An illumination apparatus for a motor vehicle, the apparatus comprising:

at least one light source from which light is emitted when the illumination apparatus is in operation;

a collimation optical system through which, when the illumination apparatus is in operation, the light emitted from the at least one light source passes at least in part; and a secondary optical system with at least one array of cylinder lenses arranged adjacently on a face, through which, when the illumination apparatus is in operation, the light emitted by the collimation optical system passes at least in part, the secondary optical system having an entry face and an exit face for the light emitting from the collimation optical system, wherein the secondary optical system is arranged in the illumination apparatus such that the normal on the exit face of the secondary optical system forms an angle unequal to 0° and unequal to 180° with the vehicle longitudinal direction when the illumination apparatus is installed in the motor vehicle, and wherein the cylinder lenses of the at least one array are arranged such that the cylinder axes of the cylinder lenses form an angle unequal to 0° and unequal to 180° with the vertical when the illumination apparatus is installed in the motor vehicle.

14. The illumination apparatus according to claim 13, wherein the angle which the normal forms with the longitudinal direction of the vehicle on the exit face of the secondary optical system when the illumination apparatus is installed in the motor vehicle is less than 30° or equal to 30°.

15. The illumination apparatus according to claim 13, wherein the angle which the cylinder axes of the cylinder lenses form with the vertical when the illumination apparatus is installed in the motor vehicle is between 1° and 10°, between 2° and 7°, or about 4°.

16. The illumination apparatus according to claim 13, wherein the illumination apparatus is a headlight for the motor vehicle.

* * * * *